May 10, 1955 — A. V. BEDFORD — 2,708,257
ANTI-HUNT CIRCUIT FOR ELECTRIC MOTOR FOLLOW-UP SYSTEM
Filed Oct. 31, 1944 — 2 Sheets-Sheet 1

INVENTOR.
Alda V. Bedford
BY
ATTORNEY

May 10, 1955     A. V. BEDFORD     2,708,257
ANTI-HUNT CIRCUIT FOR ELECTRIC MOTOR FOLLOW-UP SYSTEM
Filed Oct. 31, 1944     2 Sheets-Sheet 2
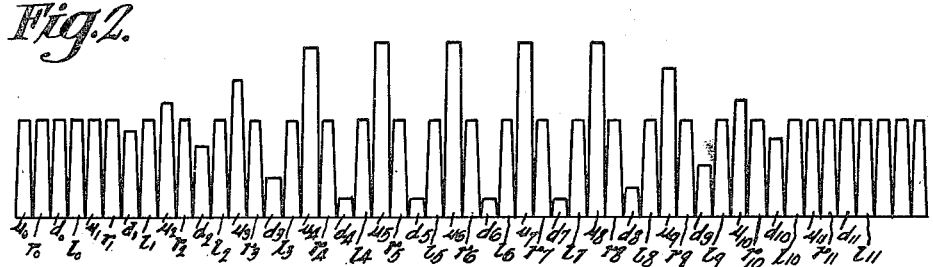
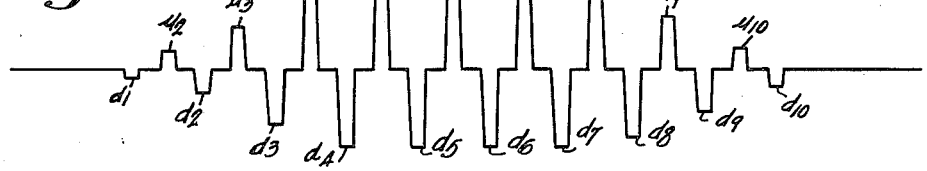
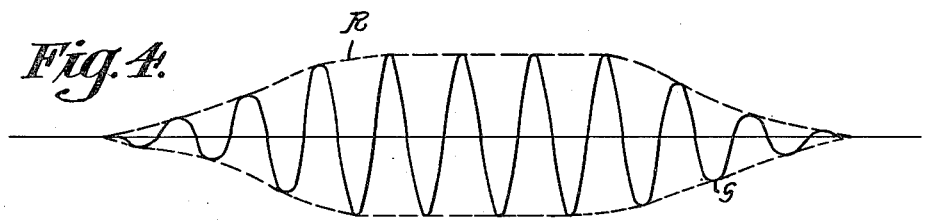
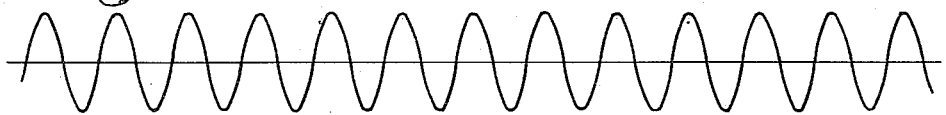
INVENTOR.
Alda V. Bedford
BY
ATTORNEY United States Patent Office 2,708,257
Patented May 10, 1955

2,708,257

ANTI-HUNT CIRCUIT FOR ELECTRIC MOTOR FOLLOW-UP SYSTEM

Alda V. Bedford, Princeton, N. J., assignor to Radio Corporation of America, a corporation of Delaware Application October 31, 1944, Serial No. 561,191

11 Claims. (Cl. 318—18)

This invention relates to electrical servo systems and the like, and more particularly to systems for producing voltages proportional to the first and higher order time derivatives of a control voltage such as the "displacement signal" in an electrical servo system. The term servo system as used herein is defined as the combination with a motor of means for controlling the energization of the motor actuating an element in response to a signal which is a function of the angular displacement of the element from its desired angular position, in such manner that the motor tends to drive the element to a position such that the displacement signal is zero, whereupon the motor is deenergized.

It is well known to those skilled in the art that such systems exhibit inaccuracies in operation, owing to unavoidable delay in the response of the motor to the control signal and to the characteristics of mass, friction and compliance of the mechanical components. The motor may "stall" before the position of zero control signal is attained, or may overshoot the correct position, causing the application of reverse power further overshooting, and consequent mechanical oscillation, which may be damped or continuous, and is known as "hunting." Such tendencies toward defective operation are ordinarily minimized by adding to the displacement signal, which is proportional in effect to the difference between the current position of the motor actuated element and the required position, further signal components which are proportional to the first and higher order time derivatives of the displacement signal.

The principal object of the present invention is to provide improved methods of and means for deriving, from an A.-C. control voltage whose magnitude may vary with time, voltages which are proportional to time derivatives of said control voltage. Another object is to provide improved servo systems of the type in which a variable magnitude A.-C. control voltage is employed.

The invention will be described as embodied in a radio aircraft locator system. It is to be understood, however, that the system of the invention may be applied to substantially any electrical servo system employing a variable amplitude A.-C. control signal.

Figure 1 of the drawings is a schematic diagram of an automatic self-orienting aircraft detector system of the radio reflection type.

Figure 2 is an oscillogram illustrating the output of the receiver of the system of Figure 1 under certain operating conditions.

Figure 3 is an oscillogram illustrating the control voltage occurring in the system of Figure 1 under the conditions represented by Figure 2.

Figure 4 is an oscillogram illustrating the fundamental 60 cycle component of the voltage of Figure 3.

Figure 5 is an oscillogram of a constant amplitude 60 cycle voltage.

Figure 6 is an oscillogram illustrating a voltage similar to that of Figure 3 but varying in accordance with the time derivative of the amplitude of the voltage of Figure 3.

Figure 7 is an oscillogram illustrating the 60 cycle component of the voltage of Figure 6.

Figure 8 is an oscillogram of a voltage similar to that of Figure 6 but varying in accordance with the time derivative of the amplitude of the voltage of Figure 6, or the second derivative of the amplitude of the voltage of Figure 3, and Figure 9 is an oscillogram illustrating the 60 cycle component of the voltage of Figures 8.

Figure 1:
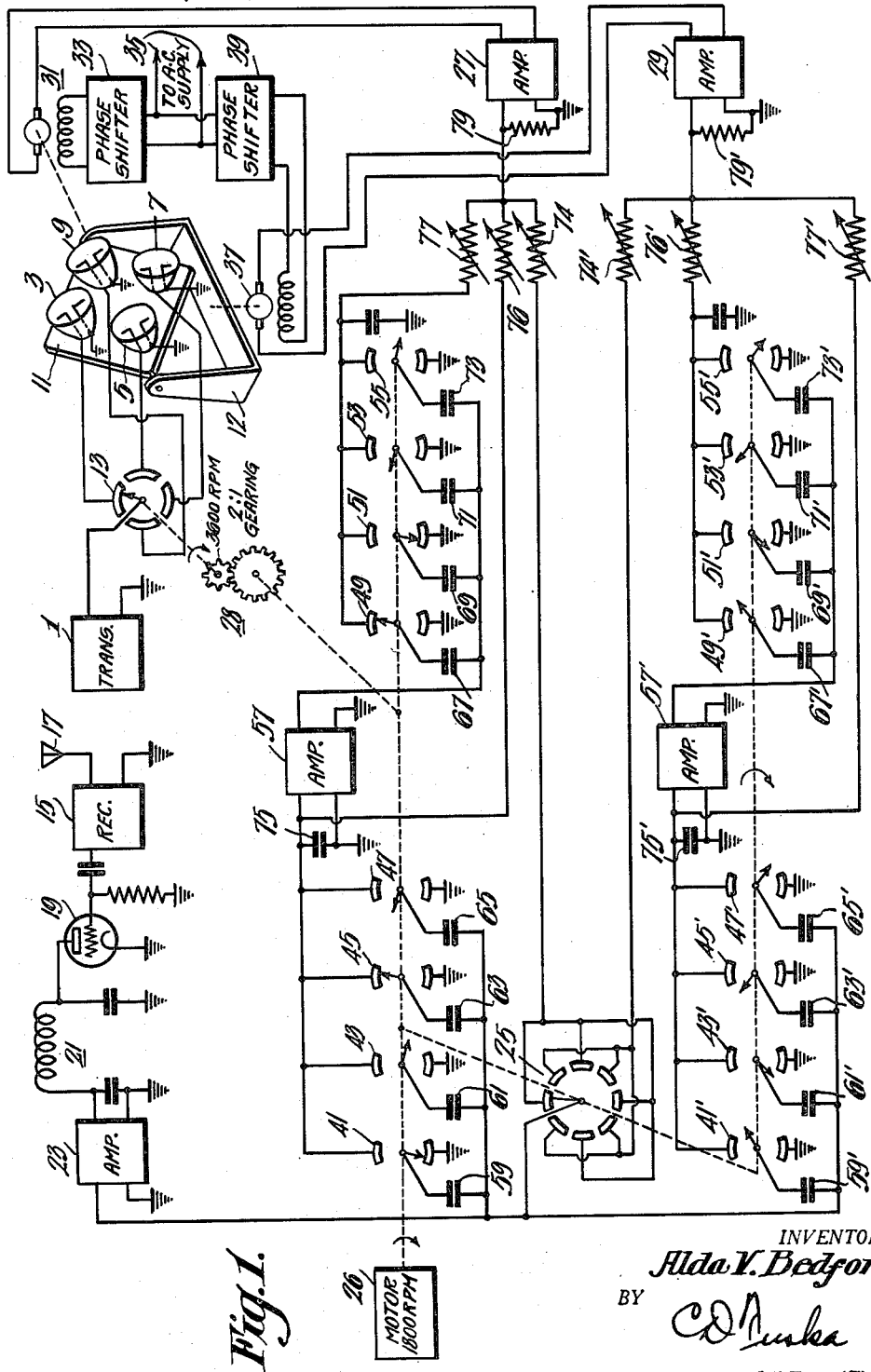

Referring to Figure 1, the aircraft locator system in connection with which the invention will be described, is similar to that described in copending U. S. application Ser. No. 470,692 filed on December 30, 1942 by William A. Tolson and entitled Control of Servo Mechanisms, now matured into U. S. Patent 2,421,663. A radio transmitter 1 is arranged to provide high frequency energy, which may be pulse modulated, as described in the above-mentioned Tolson application, frequency modulated or unmodulated. For the purpose of describing the present invention it is simpler to assume that the transmitter 1 is unmodulated. Four directive antennas 3, 5, 7 and 9 are arranged on a supporting member 11 in such manner that the axes of their directive patterns are inclined respectively upward, to the right, below and to the left of a common line. The antennas 3, 5, 7 and 9 are connected to the transmitter 1 through a four-position switch 13 in such manner that as the movable contact of the switch 13 is rotated the antennas are sequentially energized by the transmitter, providing radiation sequentially in four overlapping lobes of generally conical shape.

A receiver 15 is provided with an antenna 17 and has its output circuit connected to a rectifier 19, as in the above-mentioned Tolson application. The output circuit of the rectifier 19 is coupled through a low-pass filter 21 to an amplifier 23. The amplifier 23 is coupled to a switch 25, similar in construction to the switch 13 but provided with twice as many segments, with alternate segments connected together. The switch 25 is driven at constant speed, for example 1800 R. P. M., by a synchronous motor 26 coupled thereto as indicated by dash lines. The switch 13 is also driven by the motor 26 through gearing 28, at 3600 R. P. M. Half of the segments of the switch 25 are connected to an amplifier 27, through a resistor 74, and the other half of the segments are similarly connected to a second amplifier 29. The output circuit of the first amplifier 27 is connected to the armature circuit of an A.-C. motor 31. The field winding of the motor 31 is connected through a phase shifter 33 to A.-C. supply lines 35. The output shaft of the motor 31 is coupled to the antenna supporting member 11 so as to rotate the antenna assembly about a horizontal axis within the trunnion member 12.

The output circuit of the second amplifier 29 is coupled to a second A.-C. motor 37. The field winding of the motor 37 is connected through a phase shifter 39 to the A.-C. supply. The shaft of the motor 37 is coupled to the member 12 so as to rotate the antenna assembly about a vertical axis.

The operation of the system thus far described is as follows: Energy from the transmitter 1 is radiated successively by the antennas 3, 5, 7 and 9 in slightly different directions. Assuming that an aircraft is within the cone of radiation of at least one of the antennas, the radiated signal is reflected thereby to the receiving antenna 17. The received signal is amplified in the receiver 15 and rectified by the rectifier 19. The filter 21 rejects the high frequency components of the output of the detector 19 but passes the pulses corresponding to the keying of the transmitting antennas by the switch 13. If the aircraft lies in the common axis of the intersection of the radiation patterns of the transmitting antennas, the successive pulses corresponding to the connection of the successive antennas will be of equal amplitudes. This is illustrated in Figure 2 where the pulses $u_0$, $r_0$, $d_0$ and $l_0$ are of equal amplitudes.

Now suppose that the line of sight to the aircraft is increasing in elevation. The reflections from the downwardly directive antenna 7 will decrease in amplitude, while those from the upwardly directive antenna will increase in amplitude. Thus the successive down pulses $d_1$, $d_2$, $d_3$ and $d_4$ are of decreasing amplitudes, while at the same time successive up pulses $u_2$, $u_3$, $u_4$ and $u_5$ are of increasing amplitudes. As long as the axis of the antenna system is displaced downwardly with respect to the line of sight to the aircraft, this condition continues, resulting in pulses $d_5$, $d_6$, $d_7$ etc.

As the elevation of the antenna axis is increased to equal that of the line of sight, the down pulses increase in amplitude while the up pulses decrease in amplitude, until finally the up and down pulses are again equal. It has been assumed so far that no displacement of the line of sight to the right or left of the antenna axis has occurred. Thus all the $r$ and $l$ pulses are of equal magnitudes.

The amplifier 23 may be of the ordinary audio type. The switch 25 is so phased with respect to the switch 13 that the up and down pulses are applied to the input circuit of the amplifier 27 while the right and left pulses are applied to the amplifier 29. The amplifier 23 need not pass D.-C., and assuming that it does not, the D.-C. component is removed so that the signal applied to the amplifier 27 from the switch 25 is of the type illustrated in Figure 3. This signal is further amplified by the amplifier 27 and applied to the armature of the motor 31.

Since the field of the motor 31 is energized with 60 cycle current, the 60 cycle component of the armature current is the only one capable of producing any substantial torque. The 60 cycle component of the voltage applied to the amplifier 27 by the switch 25 is illustrated by the oscillogram of Figure 4. The field excitation of the motor 31 is represented by the oscillogram of Figure 5. The phase shifter 33 is adjusted so that the field excitation is substantially in phase with the armature current. Thus as the antenna axis is displaced above the line of sight, the motor 31 is energized to provide torque tending to rotate the antenna assembly so as to make its axis coincide with its line of sight. If the antenna axis were above the line of sight, the down pulses would predominate over the up pulses, producing armature excitation 180° out of phase with that illustrated by Fig. 4, causing the motor 31 to rotate in the opposite direction. It is evident that the magnitude of the motor excitation increases with increase in the angular difference between the antenna axis and the line of sight.

The right-left channel including the amplifier 29 and the motor 37 operates in response to the $r$ and $l$ pulses in exactly the same manner as the up-down channel. The above-described operation will take place only if the gains of the amplifiers 23 and 27 are restricted to low values such that over-travelling and hunting cannot occur. If the amplifier gain is restricted, then the accuracy will be impaired owing to the fact that the motor will provide insufficient torque to overcome friction entirely and drive the antenna assembly to the final position. This difficulty may be overcome by using gears or equivalent means to increase the torque applied by the motors to the antennas. However, the speed of operation will then be too low for practical operation in many cases. Accordingly, in order to provide reasonable speed of operation and high accuracy, first and second derivatives of the control signal are required.

The derivative control signals are provided as follows: A plurality of switches 41, 43, 45, 47, 49, 51, 53 and 55 are coupled to the motor 26, as indicated by the dash lines. These switches are similar in construction to the switch 13 with the exception that each switch has only two diametrically opposite segments, each extending through an arc of approximately 45°. The upper segments of the switches 41, 43, 45 and 47 are connected together to the input circuit of an amplifier 57, and coupled to the input circuit of the amplifier 27 through a resistor 76. The lower segments are grounded. The rotating contacts are connected to the output circuit of the amplifier 23 through capacitors 59, 61, 63 and 65 respectively. The rotating contacts are phased at 90° intervals so that when the contact of the switch 41 is in its lower position, that of the switch 45 is in its upper position, and those of the switches 43 and 47 extend to the right and left respectively. The switches 49, 51, 53 and 55 are connected to the output circuit of the amplifier 57 through capacitors 67, 69, 71 and 73 respectively. The lower contacts are grounded, and the upper contacts are all connected together through an adjustable resistor 77 to the input circuit of the amplifier 27. The rotatable contacts of the switches 49, 51, 53 and 55 are spaced at 90° intervals.

The right-left channel is also provided with switches and capacitors exactly like those described with the up-down channel, except that the contacts are all advanced 45° with respect to those of the up-down channel. The elements of the right-left channel are indicated by primed reference numerals similar to those applied to corresponding elements of the up-down channel.

The operation of the system, starting with the various switches in the positions indicated in Figure 1, is as follows: The signal is radiated from the antenna 3 and reflected back to the receiving antenna 17, producing the pulse $u_0$ at the output of the amplifier 23. The capacitor 59 is thereby charged to a voltage proportional to the amplitude of the pulse $u_0$. During the following 240th-second period, energy is radiated from the antenna 5. None of the switches in the up-down channel are closed at this time. During the next 240th-second period, energy is radiated from the antenna 7, providing the pulse $d_0$ at the output circuit of the amplifier 23, and the capacitor 61 is charged to a voltage proportional to the magnitude of the pulse $d_0$. Upon the occurrence of the next up pulse $u_1$, the capacitor 63 is charged to a corresponding value. Simultaneously, the pulse $u_1$ is applied to the amplifier 57 through the upper contact of the switch 41 and in series with the capacitor 59. Since the capacitor 59 is already charged to a value corresponding to $u_0$, the net voltage applied to the amplifier 57 is proportional to $u_1-u_0$. In the case illustrated, the pulses $u_1$ and $u_0$ are of equal magnitude, hence the voltage applied to the amplifier 57 at this time is zero.

During the following down pulse $d_1$, the switch 43 is on its upper contact. Since the capacitor 61 is already charged to a voltage proportional to $d_0$, the net voltage applied to the amplifier 57 is $d_1-d_0$. In the illustrated case (Fig. 2) $d_1$ is actually less than $d_0$. Thus the voltage applied to the amplifier is negative as indicated by the pulse $d_1-d_0$ in Figure 6. As the rotation of the switches continues, successive up pulses are compared in the described manner to provide successive differential pulses $u_2-u_1$, $u_3-u_2$, etc., and successive down pulses are similarly compared to provide differential pulses $d_2-d_1$, $d_3-d_2$, etc. These pulses are conducted to the input circuit of the amplifier 27 through the resistor 76 and are added in the resistor 79 to the displacement signal shown in Figure 3. The fundamental frequency of the pulse train of Figure 6 is 60 cycles. The 60 cycle component of the train of Figure 6 is shown enlarged in Figure 7. The amplitude (or envelope) of the wave of Figure 7 is substantially proportional at all times to the time derivative of the amplitude (or envelope) of the wave of Figure 4.

The switches 49, 51, 53 and 55 operate upon the pulse train of Figure 6 in the same manner as the switches 41, 43, 45 and 47 operate upon the wave train of Figure 3. The resultant differential pulse train, shown in Fig. 8, comprises pulses $d_1-d_0-0$, $u_2-u_1-0$, $$(d_2-d_1)-(d_1-d_0)=d_2-2d_1-0$$

$u_2-2u_1-u_0$, $d_3-2d_2-d_1$, etc. The 60 cycle component of this train is illustrated in Figure 9. The amplitude of the curve of Figure 9 is proportional to the time derivative of that of the curve of Figure 7 and hence to the second derivative of that of Figure 4. It is noteworthy that the phase of the component represented by Figure 9 reverses at approximately the point R. Examination of Figure 4 shows that this point corresponds to the point at which the rate of change of amplitude of the displacement signal begins to decrease.

As the operation of the system continues, the motor 31 drives the antenna assembly so that the displacement signal decreases. The resulting derivative signals are illustrated in Figures 6 and 7. It will be observed that the 60 cycle component is now 180° out of phase with the displacement signal. Similarly the second derivative signals are shown in Figures 8 and 9. The second derivative is also out of phase with the displacement signal up to approximately the point S at which the rate of decay of the displacement signal begins to decrease. From this point on the second derivative signal is out of phase with the first derivative signal and in phase with the displacement signal. The proportionality of effect of the displacement and derivative signals may be adjusted by means of the resistors 74, 76, 77 to conform to the physical characteristics of mass and resistance of the antenna assembly. With proper adjustment the effects of mass are compensated by the second derivative signal component and those of resistance are compensated by those of the first derivative signal component, causing the structure to move through a displacement substantially corresponding to the displacement signal, without lag or overtravelling.

The operation of the left-right channel is identical in all respects with that of the up-down channel. The various switches are phased so that the left and right pulses are selected. It will be apparent that either channel could be operated alone if desired, or a number of additional channels could be provided with similar time division multiplexing arrangements if required.

I claim as my invention:

1. In an electrical servo system including means for producing and utilizing a displacement signal in the form of a train of voltage pulses of magnitudes alternately above and below a mean value, displacement signal differentiating means comprising a plurality of capacitors, means for sequentially charging said capacitors in response to respective successive pulses of said displacement signal, a utilization circuit, and means for applying each odd and each even pulse of said displacement signal to said utilization circuit through the one of said capacitors, charged by the preceding odd and even pulses, respectively.

2. In an electrical servo system including means for producing and utilizing a displacement signal in the form of a train of voltage pulses of magnitudes alternately above and below a mean value, displacement signal differentiating means comprising a plurality of capacitors, means for sequentially charging said capacitors in response to respective successive pulses of said displacement signal, a utilization circuit, means for applying said displacement signal to said utilization circuit directly, and means for applying each odd and each even pulse of said displacement signal to said utilization circuit through the one of said capacitors, charged by the preceding odd and even pulses, respectively.

3. An electrical servo system including an output shaft, a motor coupled to said shaft, means responsive to the position of said shaft to provide a displacement signal comprising a train of pulses, successive pulses having magnitudes respectively above and below a mean value by amounts substantially proportional to the difference between the actual position of said output shaft and the position to which it is to be driven, four capacitors, periodic switch means for applying the first of each group of four pulses to the first of said capacitors, the second pulse of each group of four to the second capacitor, and so on, a voltage combining circuit, and periodic switch means for cyclically applying to said combining circuit the first pulse of each of said groups through the third of said capacitors, the second pulse through the fourth of said capacitors, the third pulse through the first of said capacitors, and the fourth pulse through the second of said capacitors, and means for controlling the energization of said motor in response to the output of said combining circuit.

4. An electrical servo system including an output shaft, a motor coupled to said shaft, means responsive to the position of said shaft to provide a displacement signal comprising a train of pulses, successive pulses having magnitudes respectively above and below a mean value by amounts substantially proportional to the difference between the actual position of said output shaft and the position to which it is to be driven, a plurality of capacitors, switch means for applying the first of each group of pulses to the first of said capacitors, the second pulse of each group to the second capacitor, and so on, a voltage combining circuit, means for applying each of said pulses to said combining circuit through a respective one of said capacitors, and means for controlling the energization of said motor in response to the output of said combining circuit.

5. An electrical servo system including an output shaft, a motor coupled to said shaft, means responsive to the position of said shaft to provide a displacement signal comprising a train of pulses, successive pulses having magnitudes respectively above and below a mean value by amounts substantially proportional to the difference between the actual position of said output shaft and the position to which it is to be driven, four capacitors, means for applying the first of each group of four pulses to the first of said capacitors, the second pulse of each group of four to the second capacitor, and so on, a voltage combining circuit, means for applying to said combining circuit the first pulse of each of said groups through the third of said capacitors, the second pulse through the fourth capacitor, the third pulse through the first capacitor, and the fourth pulse through the second capacitor, and means for controlling the energization of said motor in response to the output of said combining circuit.

6. An electrical servo system including an output shaft, a motor coupled to said shaft, means responsive to the position of said shaft to provide a displacement signal comprising a train of pulses, successive pulses having magnitudes respectively above and below a mean value by amounts substantially proportional to the difference between the actual position of said output shaft and the position to which it is to be driven, four capacitors, means for applying the first of each group of four pulses to the first of said capacitors, the second pulse of each group of four to the second capacitor, and so on, a voltage responsive utilization circuit, means for applying said displacement signal to said utilization circuit, means for applying each pulse to said utilization circuit through the capacitor which is charged by the previous alternate pulse, and means for controlling the energization of said motor in response to the combined output of said utilization circuit so as to drive said shaft in a direction tending to reduce said displacement signal.

7. In an electrical servo system including means for producing and utilizing a displacement signal comprising a train of voltage pulses of magnitudes alternately above and below a mean value, displacement signal differentiating means comprising a group of capacitors, means for sequentially charging said capacitors to store respective successive pulses of said displacement signal, a utilization circuit, means for applying said displacement signal directly to said utilization circuit, means for applying each pulse of said displacement signal to said combining circuit through the respective one of said capacitors which is charged with the previous corresponding pulse of said displacement signal to provide a differential pulse train, means for applying said differential pulse train directly to said combining circuit; a second group of capacitors, means for sequentially charging said capacitors of said second group to store respective successive pulses of said differential train, and means for applying each pulse of said differential pulse train to said combining circuit through the respective one of said second group of capacitors which is charged with the previous corresponding pulse of said differential pulse train.

8. In an electrical servo system including means for producing and utilizing a displacement signal comprising a train of voltage pulses of magnitudes alternately above and below a mean value, a group of capacitors, periodic switch means for applying successive pulses of said displacement signal to said capacitors respectively in sequence, a voltage combining circuit, means for applying said displacement signal directly to said voltage combining circuit, periodic switch means for applying each pulse of said displacement signal to said combining circuit through the respective one of said capacitors which is charged with the previous corresponding pulse of said displacement signal to provide a differential pulse train, means for applying said differential pulse train directly to said combining circuit; a second group of capacitors, periodic switch means for applying successive pulses of said differential pulse train to said capacitors of said second group respectively in sequence, and periodic switch means for applying each pulse of said differential pulse train to said combining circuit through the respective one of said second group of capacitors which is charged with the previous corresponding pulse of said differential pulse train.

9. Means for generating an A.-C. wave having an amplitude proportional to the time derivative of the amplitude of an A.-C. input wave consisting of at least one train of lobes or pulses, where said amplitudes refer to the voltage of the alternate pulses of the wave respectively above and below a mean value, which means comprises: an output circuit, an input circuit, a plurality of capacitors, commutating means for connecting one of said capacitors across the input circuit during each odd pulse and then connecting the input circuit through said capacitor to the output circuit during each next odd pulse whereby a pulse having amplitude proportional to the algebraic difference of the amplitudes of the two odd pulses occurs in the output circuit, and commutating means for connecting a second of said capacitors across the input circuit during each even pulse and then connecting the input circuit through said second capacitor to the output circuit during each next even pulse whereby a pulse having amplitude proportional to the algebraic difference of the amplitudes of the two even pulses occurs in the output circuit.

10. Means for generating an A.-C. wave having an amplitude proportional to the time derivative of the amplitude of an A.-C. input wave comprising an output circuit, an input circuit, a plurality of capacitors, commutating means for connecting one of said capacitors across the input circuit during each odd pulse and then connecting the input circuit through said capacitor to the output circuit during each next odd pulse whereby a pulse having amplitude proportional to the algebraic difference of the amplitudes of the two odd pulses occurs in the output circuit, and commutating means for connecting a second of said capacitors across the input circuit during each even pulse and then connecting the input circuit through said second capacitor to the output circuit during each next even pulse whereby a pulse having amplitude proportional to the algebraic difference of the amplitudes of the two even pulses occurs in the output circuit.

11. An electrical servo system, including an output shaft, means responsive to the position of said shaft to provide a displacement signal comprising at least one train of pulses, alternate pulses having magnitudes respectively above and below a mean value by amounts which are substantially proportional to the algebraic difference between the actual position of said output shaft and the position to which it is to be driven, means for selecting the pulses of said train to form an alternating-current wave, utilization means responsive to said alternating current wave to drive said shaft toward the desired position, a plurality of capacitors, commutating means for applying each odd pulse of said train to a respective one of said capacitors to charge said capacitor in accordance with the magnitude of that odd pulse, means for applying each next odd pulse of said train through said respective capacitor to said utilization means whereby the net pulse voltage applied to said utilization means during said next odd pulse is proportional to the difference of the magnitudes of said two odd pulses, commutating means for applying each even pulse of said train to a second respective one of said capacitors to charge said second capacitor in accordance with the magnitude of that even pulse, means for applying each next even pulse of said train through said second capacitor to said utilization means whereby the net pulse voltage applied to said utilization means during said next even pulse is proportional to the difference of the magnitudes of said two even pulses, whereby there is formed and utilized a second alternating-current wave having amplitude proportional to the time derivative of the amplitude of said first alternating-current wave.

References Cited in the file of this patent
UNITED STATES PATENTS

| | | |
|---|---|---|
| 1,554,698 | Alexanderson | Sept. 22, 1925 |
| 2,186,268 | Pakala | Jan. 9, 1940 |
| 2,233,415 | Hull | Mar. 4, 1941 |